United States Patent [19]

Tisue

[11] 4,000,368
[45] Dec. 28, 1976

[54] NONUNIFORM CLOCK GENERATOR FOR DOCUMENT REPRODUCTION APPARATUS

[75] Inventor: James G. Tisue, Mountain View, Calif.

[73] Assignee: Dacom, Inc., Santa Clara, Calif.

[22] Filed: Aug. 4, 1975

[21] Appl. No.: 601,309

[52] U.S. Cl. .............................. 358/264; 358/285
[51] Int. Cl.$^2$ .......................................... H04L 7/00
[58] Field of Search ................ 178/7.1, 7.6, 69.5 F

[56]         References Cited
         UNITED STATES PATENTS

| 3,506,786 | 4/1970 | Sloffte | 178/69.5 F |
| 3,800,080 | 3/1974 | Fuwa | 178/7.6 X |
| 3,887,765 | 6/1975 | Murahse et al. | 178/7.6 |
| 3,922,485 | 11/1975 | Starkweather et al. | 178/7.6 |

Primary Examiner—Robert L. Griffin
Assistant Examiner—Aristotelis M. Psitos
Attorney, Agent, or Firm—Boone, Schatzel, Hamrick & Knudsen

[57]    ABSTRACT

An electronic nonuniform clock generating apparatus including a modulo N counter for counting uniform clock pulses in a controlled manner to develop a series of clock pulses which are nonlinearly related to the rotation of a scanning device to form a nonuniform clock signal comprised of a series of different clock states each including one or more uniform clock pulses, a clock signal counter for counting the nonuniform clock signal pulses, a clock signal decoder which is preprogrammed to develop an increment signal each time the count developed by the clock signal counter reaches a number commensurate with the number of pulses in a particular state, a state counter for counting the number of increment signals developed by the clock signal decoder to develop a clock signal decoder, and a state decoder responsive to the clock state signal output of the state counter and operative to control the operation of the modulo N counter.

12 Claims, 3 Drawing Figures

NONUNIFORM CLOCK GENERATOR FOR DOCUMENT REPRODUCTION APPARATUS

BACKGROUND OF THE INVENTION

1. Field of the Invention

The present invention relates generally to document reproduction apparatus and more particularly to an improvement for such apparatus including means for generating nonlinear clock signals used to compensate for signal distortion resulting from the use of rotary scanning devices.

2. Description of the Prior Art

One of the more serious problems which confronts the designers of high speed document reproduction systems is the difficulty of obtaining uniform quality data over the length of a scan line. This difficulty often results from variations in the distance between the line scanning device and the respective data containing segments of the scan line such as is the case where rotating mirrors or other rotating light focusing or transmitting means are used as a scanning device for collecting light emanating from a line extending across a flat document surface.

More particularly, when using such devices, signal distortions are caused by the nonlinear relationship between the rotation of the shaft supporting the light focusing or collecting device and the length of scan line per increment of shaft rotation. In other words, where the shaft is positioned over the center of the document and is rotated at a constant speed, the shaft angle required to cause the light detecting device to scan a short segment of the scan line near the document edges is substantially less than that required to scan a like segment of the line at the middle of the document. It will thus be appreciated that some type of nonuniform clocking mechanism is required to enable the data to be sampled at nonuniform rates depending upon where along the scan line the data is being taken from.

Prior art attempts to solve this problem have included the provision of nonuniformly spaced timing marks on the shaft perimeter and the use of nonlinearly coded wheels synchronized with the shaft position coupled with mark/detecting devices for generating the requisite nonlinear clock pulses. However, the use of such mechanical solutions requires highly accurate alignment of the various mechanical components and in many cases imposes unreasonable manufacturing tolerance requirements. The problem is even further complicated where multiple data scanning devices are affixed to the same shaft in order to improve the duty cycle of the scanner, since not only must the various scanning devices be accurately positioned relative to the surface to be scanned, but they must also be accurately positioned relative to each other.

SUMMARY OF THE PRESENT INVENTION

It is therefore an object of the present invention to provide an electronic nonuniform clock generating device which is keyed to the position of both the scanning device and the document supporting surface so that the nonuniform clock signals are provided electronically, rather than mechanically and are thus, nondependent on mechanical alignment of components.

Briefly, a preferred embodiment of the present invention includes apparatus associated with the document scanning device for developing a series of uniform clock pulses linearly related in time to the rotation of the scanning device, a modulo N counter for counting the uniform clock pulses in a controlled manner to develop a series of clock pulses which are nonlinearly related to the rotation of the scanning device and form a nonuniform clock signal, the nonuniform clock signal being comprised of a series of different clock states each including one or more uniform clock pulses, a clock signal counter for counting the nonuniform clock signal pulses, a clock signal decoder which is preprogrammed to develop an increment signal each time the count developed by the clock signal counter reaches a number commensurate with the number of pulses in a particular state, a state counter for counting the number of increment signals developed by the clock signal decoder to develop a clock state signal for controlling operation of the clock signal decoder, and a state decoder responsive to the clock state signal output of the state counter and operative to control the operation of the modulo N counter.

The principal advantage of the present invention is that having once analytically determined a preferred uniform clock pulse timing for a particular machine, corresponding data can be programmed into the clock signal decoder and state decoder and be used to generate a nonuniform clock signal, the pulses of which are directly related to the position of the scanner relative to the document surface and are independent of scanning speed.

These and other objects and advantages of the present invention will no doubt become apparent to those of ordinary skill in the art after having read the following detailed description of the preferred embodiment which is illustrated in the several figures of the drawing.

IN THE DRAWING

DETAILED DESCRIPTION OF THE PREFERRED EMBODIMENT

Figure 1:
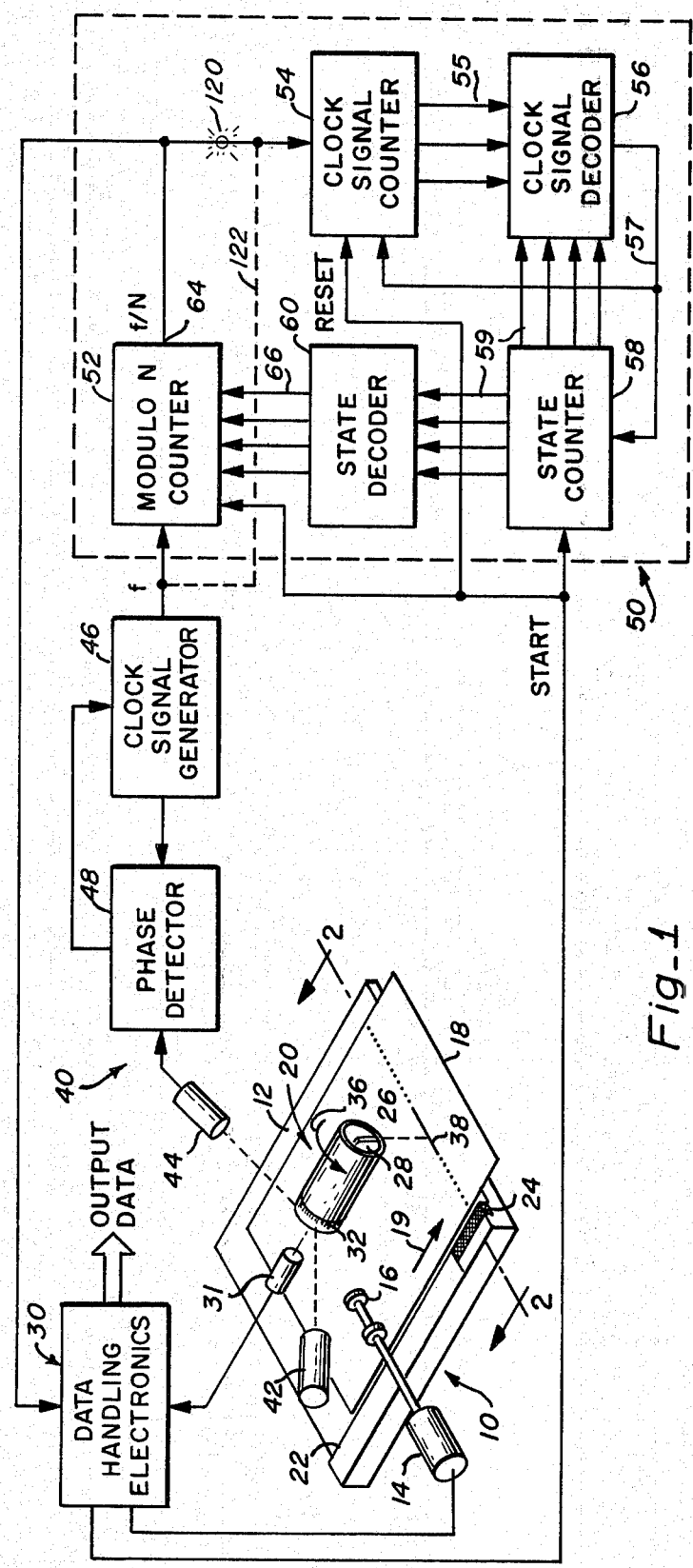
FIG. 1 is a hybrid block diagram illustrating a document scanning and data handling system including a nonuniform clock signal generator in accordance with the present invention.

Referring now to FIG. 1 of the drawing, a document scanning apparatus is shown which generally includes a document carriage apparatus 10, a document scanning device 20, scanned data handling electronics 30, a uniform clock generating circuit 40, and a nonuniform clock generating circuit 50. The document carriage apparatus 10 includes a document carrying structure 12, a document advancing stepper motor assembly 14 including friction wheels 16 which when rotated by the stepper motor cause the document 18 to be advanced in the direction shown by the arrow 19. A document guide edge 22 is provided on one side of structure 12 for use as a guide in aligning document 18. Affixed to the upper surface of the member forming the edge 22 are a pair of contiguous black and white strips having their common edges aligned parallel to edge 22 to form a sweep start marker 24.

Scanner 20 is disposed above the center of structure 12 and includes a rotatable cylinder 26 having its axis aligned parallel to edge 22. Cylinder 26 internally carries one or more optical devices 28 which focus light from spots along a scan line 38 above the surface of structure 12 onto a photodetector 31. Although the scan line 38 remains fixed in position relative to structure 12 it is to be understood that the scan line effectively moves in increments down the surface of document 18 as the document is stepwise advanced by stepper assembly 14. Suitable drive means (not shown) are coupled to cylinder 26 for causing it to rotate about its axis at a selected angular velocity and thus cause the optical device 28 to in effect sweep across the scan line 38. Light reflected from the surface of document 18 along the scan line 38 will be collected and focused by device 28 onto photodetector 31. The output of photodetector 31 is in effect an analog signal representative of the data contained on the surface of document 18 and is fed into data handling electronics represented generally by the block 30.

It will be appreciated that additional light focusing devices 28 could also be included within cylinder 26 angularly and axially separated from the illustrated device 28 so as to increase the duty factor of the scanning assembly. Moreover, the photodetectors themselves could be positioned within the cylinder 26.

In order to generate a uniform clock signal, cylinder 26 is provided with a plurality of timing marks 32 uniformly distributed around its periphery, and light from a suitable source 42 is focused onto the timing marks 32. Light reflected from the marks is detected by a suitable photoelectric detector 44 which develops a series of electrical pulses corresponding to each mark. The width of and spacing between the marks and the rotational speed of the cylinder 26 are selected so that passage of the marks passed a predetermined position can be used to generate timing pulses of a suitable frequency. The signal output by detector 44 is typically of a relatively low frequency, on the order of 100 KHz or so, because of the difficulty of sensing closely spaced marks. However, for the purposes of the present invention, a much higher frequency, on the order of 10 to 20 megaherz, is desirable. In order to provide the high frequency clock signals, a clock signal generator 46 operating at the desired high frequency $f$ is phase locked to the output of detector 44 using a phase detector 48 as illustrated. This insures that the higher frequency clock pulses are directly related to the angular position of the cylinder.

The nonlinear clock generator circuit is shown at 50 to include a modulo N counter 52, a clock signal counter 54, a clock signal decoder 56, a state counter 58 and a state decoder 60. Modulo N counter 52 is a commercially available device having an input 62 for receiving the uniform clock signal of frequency $f$, and an output terminal 64 at which it develops a nonlinear clock signal of frequency $f/N$, where N is any one of a predetermined set of integers that is selected by a digital control signal input to counter 52 through the lines 66.

By sequentially changing its count limit, or its count start as the case may be, counter 52 can be made to in effect divide the incoming frequency $f$ by a series of preselected numbers N which are related to the angular sweep of shaft 26 per unit distance along the scan line 38. In one embodiment counter 52 is a sixteen bit counter which starts counting at the count input thereto on lines 66. For example, if a ten were to be input on lines 66 then the first uniform pulse into counter 52 would be counted as nine, the second pulse as ten, the third pulse as eleven, etc., until the sixteen count was reached at which time a carry signal would be output on line 64. Thus, where the control input on lines 66 is varied in a predetermined manner, the output developed by counter 52 will provide a nonuniform clock signal which can be used to cause the data handling electronics 30 to sample the input date at uniform positions along the scan line.

Figure 2:
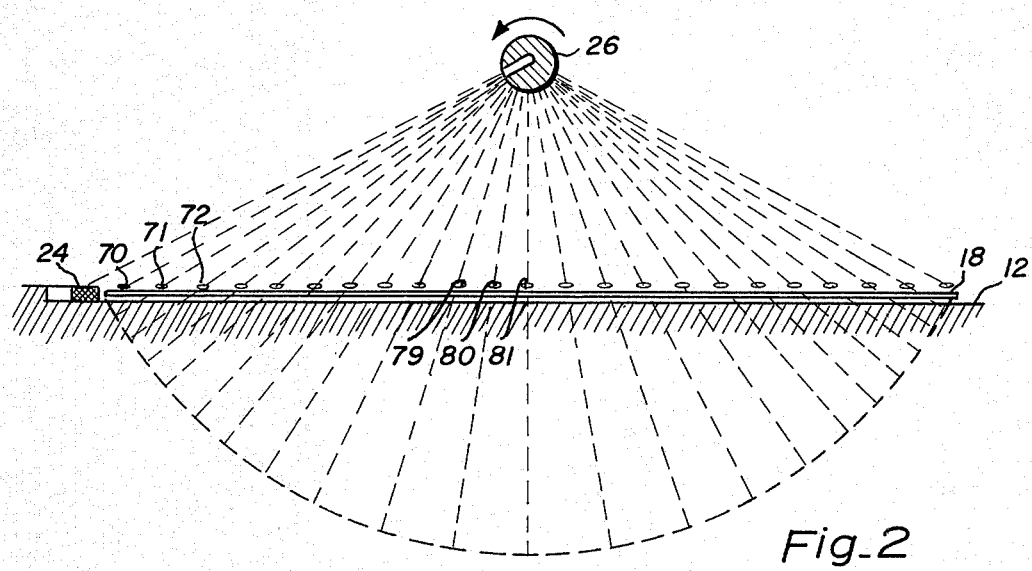
FIG. 2 is a cross section taken along the line 2—2 of the scanner and document support structure shown in FIG. 1.

In order to provide such control, the relationship of uniformly spaced points along the line 38 to the angular rotation of shaft 26 necessary to intercept the successive points is analytically determined by a method such as is illustrated in FIG. 2 of the drawing. For example, if the dots 70, 71, 72 . . . 80, 81 represent the boundaries of equally spaced subdivisions along one half of the scan line 38 and radial lines are drawn through each point from the center line of cylinder 26, it will be noted that the angular rotation of cylinder 26 required to scan from point 70 to point 71 is substantially smaller than the angle through which it must rotate to scan the distance between the points 80 and 81. Thus, in those applications where the rotational speed of cylinder 26 is constant, the time required to scan a scan line increment at the edge of the document is proportionally smaller than the time required to scan a scan line increment of equal length at the center of the document.

By identifying the times (in terms of uniform clock pulses) required to scan between each of the segments along the scan line one can establish the particular characteristics of the nonlinear clock required for the apparatus. The clock periods can then be encoded into the decoder 56 which might, for example, take the form of a read only memory (ROM). Similarly, the data required to cause counter 52 to perform the appropriate divisions of the uniform clock signal as shaft 26 revolves during the scan operation is input to the decoder 60 which likewise might take the form of an ROM.

Figure 3:
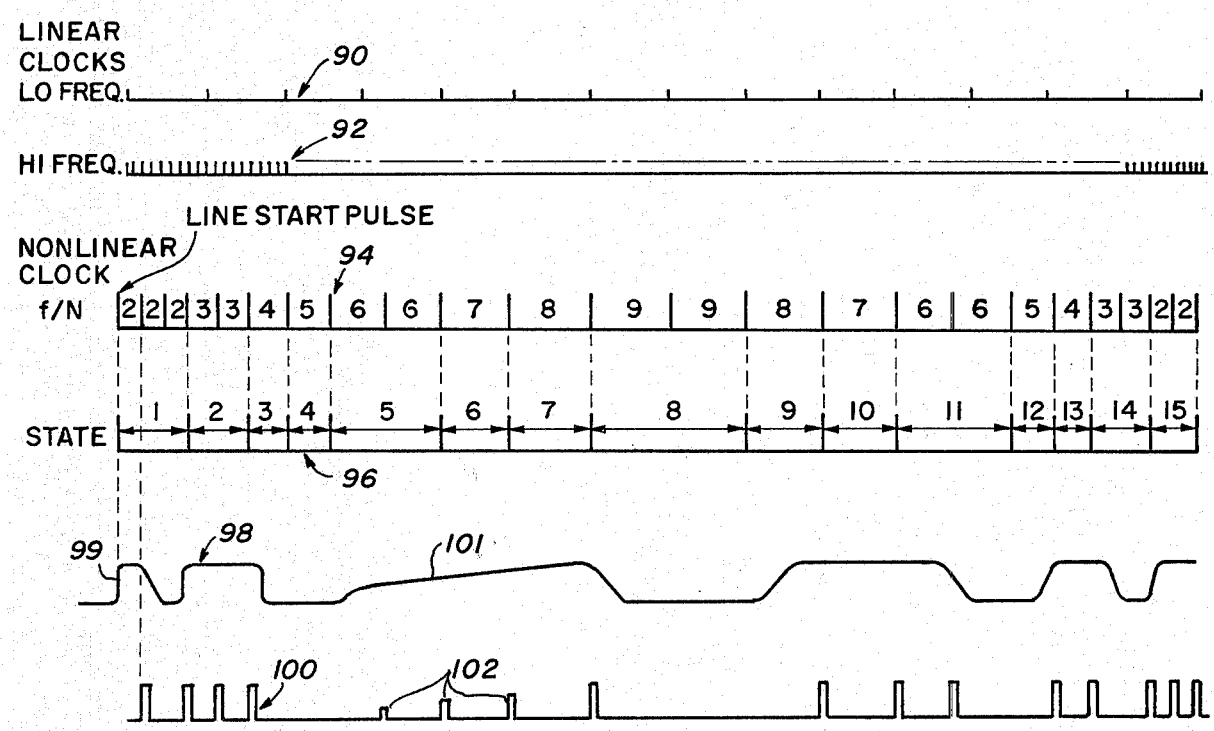
FIG. 3 is a timing diagram illustrating operation of the apparatus shown in FIG. 1.

In FIG. 3 of the drawing a timing diagram is illustrated which can be used in further describing the operation of the components of the nonuniform clock signal generating circuit 50. A low frequency uniform clock signal such as might be generated by detector 44 is shown at 90 and a corresponding high frequency uniform clock signal such as might be generated by generator 46 is depicted at 92. The analytically determined nonuniform clock signal is illustrated at 94 with the number of uniform clock pulses 92 occurring between each nonuniform pulse denoted in the spaces separating the pulses. It will be noted that although the pulse periods change from small to large between the edge of the document 18 and the center thereof, in several cases adjacent pulses have equal periods. For purposes of definition each series of pulses of a particular period are identified as being of a particular "state". For example, as illustrated at 96, all pulses having like periods are grouped together and each group is identified by a state number, i.e., state number one represents the nonuniform pulses of two uniform pulse duration; state two represents the nonuniform pulses of three uniform pulse duration; state three represents the nonuniform pulses of four uniform pulse duration, etc.

Once the nonuniform series of pulses are defined and the various clock states are assigned, this information is programmed into decoders 56 and 60. Decoder 56 is programmed in such a manner that for each state signal input in binary code on lines 59, a particular pulse count signal (corresponding to the number of pulses in that state) input on lines 55 will cause an increment signal to be output on lines 57. State decoder 60 is programmed to respond to the state signal developed on lines 61 (the same as on lines 59) and to output on lines 66 a control signal which will cause the counter 52 to count the required number of input uniform clock pulses before outputting a carry signal (nonuniform clock pulse) on line 64.

In order to illustrate the use of the nonlinear clock, reference is made to the waveform 98 which is given an analog representation of data detected along the scan line 38, and to pulse train 100 which is representative of the data sampled using the nonuniform clock 94.

After the scanner 20 is assembled and positioned relative to the carriage 10, the position of a datum line which will correspond to the surface of the paper along the scan line can be established relative to the scanner axis. Once this is accomplished and the number of equally spaced samples to be taken along the scan line is established, the angular relationship of the scanner to the various sample points is analytically determined and related back to the uniform clock pulses as illustrated by waveform 94 of FIG. 3. The like nonuniform clock periods are then grouped into clock states and this information is used to program decoders 56 and 60.

Once the encoding is completed, the apparatus is ready for use and a document to be scanned can be positioned into place for engagement by the stepper assembly 14 which will then move it into position for scanning the first line. For simplicity a single line scanner such as is illustrated will be discussed. Assuming that the timing marks 32 extend around the periphery of scanner cylinder 26 more than the segment actually needed for operation of the device it will be apparent that photodetector 44 will immediately begin to output uniform clock pulses and generator 46 will be phase locked thereto and generate high frequency uniform clock pulses. These pulses will, however, not be counted by counter 52, or if counted, the output will have no meaning until scanner 20 sweeps across start marker 24 and the abrupt data state change from white to black, as indicated at 99 in FIG. 3, is sensed by electronics 30.

When the abrupt change is detected a start signal is applied to modulo N counter 52, clock signal counter 54 and state counter 58 which causes the three counters to be reset to zero. Thereafter state counter 58 will output state one identifying information on lines 59. In response to the state one information, decoder 56 is made ready to receive state one count information over lines 55 and decoder 60 is caused to output control signals on lines 66 which set the count limit of counter 52 at three (the number of nonuniform pulses in state one). Counter 52 then immediately begins counting the input pulses 92 and at the count of two (the number of uniform clock pulses per nonuniform pulse) generates a first nonuniform (carry) pulse 94 on line 64. This occurs three times with each pulse 94 being counted by counter 54.

When the count developed on lines 55 reaches three, decoder 56 outputs an increment signal on line 57 which resets counter 54 and causes state counter 58 to increment the state signals on lines 59 to state two. State decoder 60 then changes the control signal on lines 66 so as to cause counter 52 to count up to three input pulses before generating a nonuniform pulse. Since state two includes only two nonlinear clock pulses, counter 54 will only count up to two before decoder 56 causes state counter 58 to again be incremented and in turn cause state decoder 60 to set the count limit of counter 52 at the state three level of four counts before carrying. This sequence of events will be repeated through state fifteen after which the scan is completed and stepper assembly 14 is energized to advance document 18 to the second scan line position.

In order to illustrate operation of the apparatus, additional reference is made to waveform 98 of FIG. 3 which is given as a simplified example of an analog output of the type which might be generated by photodetector 31 as scanner 20 sweeps across the scan line 38, and to pulse train 100 which is representative of the scan data output by the data handling electronics 30 when the data sampling operation is controlled by the nonuniform clock signal.

During the time that the nonuniform clock signal is being generated and fed back to the data handling electronics 40, scanner 20 is of course feeding the analog scan data through photodetector 30 to electronics 40 where the nonuniform clock pulses are used to sample the scan data and develop corresponding binary output pulses as is shown at 100. From this diagram it will be apparent that the data sampling rate is adapted to correspond to the changing scan rate. Moreover, as indicated by the amplitudes of the pulses 102, the sampled output follows the amplitude of the scanned data 101. Thus, the binary data output from data handling electronics 30 is caused to accurately represent the scanned document data, and as a result no image distortion due to nonlinearity between sample and scan rates appears in the reproduced image.

Whereas the above discussion of the use of the nonuniform clock generating circuit has for simplicity been limited to a document scanning application, it is to be understood that such circuitry has equal application in document reproduction applications and other applications wherein it is necessary that a sampling rate be dynamically varied to correspond to a varying data input rate. It will also be appreciated that whereas certain structural features of the preferred embodiment have been suggested by way of example, the invention is by no means limited to such features. For example, instead of the photoelectric means for developing the uniform clock pulses as a function of shaft or cylinder rotation, a magnetic or other suitable means could be used. Moreover, a rotating mirror, prism or other optical focusing means could be used to scan the document surface. In such case the uniform clock marks would most likely be affixed to the supporting rotary shaft.

As another alternative, instead of inputting the nonuniform clock pulses into counter 54, the output line coupling counter 52 to counter 54 could be interrupted as indicated at 120 and the uniform clock pulses developed by generator 46 coupled directly into counter 54 as indicated by the dashed line 122. In this case the information programmed into decoder 56 would be somewhat more complicated in that the numbers of uniform clock pulses per nonuniform clock pulses or per nonuniform clock states would be stored rather than simply the number of nonuniform clock pulses per clock states as in the preferred embodiment described above. However, such method would be equally workable and perhaps even more suitable for certain applications.

While the invention has been particularly shown and described with reference to a certain preferred embodiment, it will be understood by those skilled in the art that various alterations and modifications in form and detail may be made therein. Accordingly, it is intended that the following claims cover all such alterations and modifications as fall within the true spirit and scope of the invention.

What is claimed is:

1. In a document reproduction system including document carrying means, document scanning means affixed to a shaft and disposed above the carrying means for scanning a document as the shaft is rotated, clock signal generating means associated with the shaft for generating a clock signal having a predetermined relationship to the shaft rotation, and data handling apparatus for sampling the output of the scanning means at a rate determined by the clock signal to develop data from which a facsimile of the document scanned can be reproduced, an improved clock signal generating means comprising:

means associated with the said shaft and operative to generate a uniform clock signal including a train of uniformly spaced pulses;

first counter means responsive to a set of predetermined control signals and operative to count the pulses in said uniform clock signal and to generate an output pulse each time a predetermined number of said pulses commensurate with a particular control signal applied thereto are counted, the resulting series of output pulses constituting a nonuniform clock signal;

second counter means for counting each pulse in said nonuniform clock signal and for developing a pulse count signal;

first decoding means containing information relating to a predetermined set of clock states in a data scan line and information relating to a predetermined number of nonuniform clock signal pulses corresponding to each of said clock states, said first decoding means being responsive to said pulse count signal and a clock state signal and operative to output an increment signal each time a particular combination of pulse count signal and clock state signal is input thereto;

third counter means for counting said increment signals and for developing said clock state signal, said clock state signal identifying at any point in time the particular clock state of said set of clock states for which pulses are being generated by said first counter means; and second decoding means containing information relating to a predetermined set of control signals respectively corresponding to each clock state in said set of clock states, said second decoding means being responsive to said clock state signals and operative to develop a corresponding one of said set of control signals for input to said first counter means to cause it to develop said nonuniform clock signal, said nonuniform clock signal being coupled to the data handling apparatus to cause it to sample, at equal scan line intervals, nonlinear scan data taken along the scan line.

2. In a document reproduction system including document carrying means, document scanning means affixed to a shaft and disposed above the carrying means for scanning a document as the shaft is rotated, clock signal generating means associated with the shaft for generating a clock signal having a predetermined relationship to the shaft rotation, and data handling apparatus for sampling the output of the scanning means at a rate determined by the clock signal, an improved clock signal generating means comprising:

means associated with the said shaft and operative to generate a uniform clock signal including a train of uniformly spaced pulses;

first counter means responsive to a set of predetermined control signals and operative to count the pulses in said uniform clock signal and to generate an output pulse each time a predetermined number of said uniform clock signal pulses commensurate with a particular control signal applied thereto are counted, the resulting series of output pulses constituting a nonuniform clock signal;

second counter means for counting each pulse in said uniform clock signal and for developing a pulse count signal;

first decoding means containing information relating to a predetermined set of clock states in a data scan line and information relating to a predetermined number of uniform clock signal pulses corresponding to each of said clock states, said first decoding means being responsive to said pulse count signal and a clock state signal and operative to output an increment signal each time a particular combination of pulse count signal and clock state signal is input thereto;

third counter means for counting said increment signals and for developing said clock state signal, said clock state signal identifying at any point in time the particular clock state of said set of clock states for which pulses are being generated by said first counter means; and second decoding means containing information relating to a predetermined set of control signals respectively corresponding to each clock state in said set of clock states, said second decoding means being responsive to said clock state signals and operative to develop a corresponding one of said set of control signals for input to said first counter means to cause it to develop said nonuniform clock signal, said nonuniform clock signal being coupled to the data handling apparatus to cause it to sample, at equal scan line intervals, nonlinear scan data taken along the scan line.

3. Nonuniform clock signal generating apparatus, comprising:

means for generating a train of pulses forming a uniform clock signal;

first counter means responsive to a set of predetermined control signals and operative to count the pulses in said uniform clock signal and to generate an output pulse each time a predetermined number of said uniform clock signal pulses commensurate with a particular control signal applied thereto are counted, the resulting series of output pulses constituting a nonuniform clock signal;

second counter means for counting each pulse in said nonuniform clock signal and for developing a pulse count signal;

first decoding means containing information relating to a predetermined set of clock states in a data scan line and information relating to a predetermined number of nonuniform clock signal pulses corresponding to each of said clock states, said first decoding means being responsive to said pulse count signal and a clock state signal and operative to output an increment signal each time a particular combination of pulse count signal and clock state signal is input thereto;

third counter means for counting said increment signals and for developing said clock state signal, said clock state signal identifying at any point in time the particular clock state of said set of clock states for which pulses are being generated by said first counter means; and second decoding means containing information relating to a predetermined set of control signals respectively corresponding to each clock state in said set of clock states, said second decoding means being responsive to said clock state signals and operative to develop a corresponding one of said set of control signals for causing said first counter means to develop said nonuniform clock signal, said nonuniform clock signal being suitable for causing a data handling apparatus to sample at equal scan line intervals nonlinear scan data taken along a scan line.

4. Nonuniform clock signal generating apparatus as recited in claim 3 wherein said means for generating said uniform clock signal includes a rotating body having detectable marks evenly spaced thereon, and means fixed in position relative to the axis about which said body rotates for detecting passage of said marks thereby and for generating said uniform clock signal commensurate therewith.

5. Nonuniform clock signal generating apparatus as recited in claim 4 wherein said means fixed in position includes a photodetector means for detecting light reflected from said marks and for generating a first signal of a frequency less than the frequency of said uniform clock signal, a signal generator for generating said uniform clock signal, and a phase detector for phase locking said uniform clock signal to said first signal.

6. Nonuniform clock signal generating apparatus, comprising:

means for generating a train of pulses forming a uniform clock signal;

first counter means responsive to a set of predetermined control signals and operative to count the pulses in said uniform clock signal and to generate an output pulse each time a predetermined number of said uniform clock signal pulses commensurate with a particular control signal applied thereto are counted, the resulting series of output pulses constituting a nonuniform clock signal;

second counter means for counting each pulse in said uniform clock signal and for developing a pulse count signal;

first decoding means containing information relating to a predetermined set of clock states in a data scan line and information relating to a predetermined number of uniform clock signal pulses corresponding to each of said clock states, said first decoding means being responsive to said pulse count signal and a clock state signal and operative to output an increment signal each time a particular combination of pulse count signal and clock state signal is input thereto;

third counter means for counting said increment signals and for developing said clock state signal, said clock state signal identifying at any point in time the particular clock state of said set of clock states for which pulses are being generated by said first counter means; and second decoding means containing a predetermined set of control signals respectively corresponding to each clock state in said set of clock states, said second decoding means being responsive to said clock state signals and operative to develop a corresponding one of said set of control signals for causing said first counter means to develop said nonuniform clock signal, said nonuniform clock signal being suitable for causing a data handling apparatus to sample at equal scan line intervals nonlinear scan data taken along a scan line.

7. Document scanning apparatus, comprising:

document carriage means for carrying a document to be scanned;

document scanning means disposed above said carriage means and including a light detector and a rotatable optical system for reflecting light from different points along a scan line across the surface of a document carried by said carriage means onto said light detector as said optical system is rotated, whereby said light detector generates electrical signals proportional to the light reflected thereon to;

timing means for monitoring the rotation of said optical system and for developing a uniform clock signal including a series of pulses linearly related in time to said rotation;

first counter means responsive to a set of predetermined control signals and operative to count the pulses in said uniform clock signal and to generate an output pulse each time a predetermined number of said uniform clock signal pulses commensurate with a particular control signal applied thereto are counted, the resulting series of output pulses constituting a nonuniform clock signal;

second counter means for counting each pulse in said nonuniform clock signal and for developing a pulse count signal;

first decoding means containing information relating to a predetermined set of clock states in a data scan line and information relating to a predetermined number of nonuniform clock signal pulses correspondng to each of said clock states, said first decoding means being responsive to said pulse count signal and a clock state signal and operative to output an increment signal each time a particular combination of pulse count signal and clock state signal is input thereto;

third counter means for counting said increment signals for developing said clock state signal, said clock state signal identifying at any point in time the particular clock state of said set of clock states for which pulses are being generated by said first counter means;

second decoding means containing information relating to a predetermined set of control signals respectively corresponding to each clock state in said set of clock states, said second decoding means being responsive to said clock state signals and operative to develop a corresponding one of said set of control signals for causing said first counter means to develop said nonuniform clock signal; and data handling means for sampling said electrical signals at a rate determined by said nonuniform clock to develop binary output signals from which a facsimile of the scanned document can be reproduced.

8. Document scanning apparatus as recited in claim 7 wherein said carriage means includes means forming a sweep start marker disposed adjacent the position occupied by the scanned document, said marker including contiguous surfaces areas, one being of a reference light shade and the other being of a reference dark shade, the boundary line between said areas intersecting the scan line of said scanning means substantially normal thereto, detection of said marker by said scanning means being used to indicate the start of a scan line.

9. Document scanning apparatus as recited in claim 8 wherein said rotatable optical system includes detectable marks uniformly distributed around the axis thereof and wherein said timing means includes means for detecting passage of said marks relative thereto and for developing a timing signal commensurate therewith.

10. Document scanning apparatus as recited in claim 9 wherein said timing means further includes a signal generator for generating said uniform clock signal, and means for phase locking said uniform clock signal to said timing signal.

11. A document reproduction system comprising:
document carrying means;
document scanning means for scanning a document carried by said carrying means;
means associated with said scanning means for generating a uniform clock signal including a series of pulses having a predetermined relationship to said scanning means;
first counter means responsive to a set of predetermined control signals and operative to count the pulses in said uniform clock signal and to generate an output pulse each time a predetermined number of said pulses commensurate with a particular control signal applied thereto are counted, the resulting series of output pulses constituting a nonuniform clock signal;
second counter means for counting each pulse in said nonuniform clock signal and for developing a pulse count signal;
first decoding means containing information relating to a predetermined set of clock states in a data scan line and information relating to a predetermined number of nonuniform clock signal pulses corresponding to each of said clock states, said first decoding means being responsive to said pulse count signal and a clock state signal and operative to output an increment signal each time a particular combination of pulse count signal and clock state signal is input thereto;
third counter means for counting said increment signals and for developing said clock state signal, said clock state signal identifying at any point in time the particular clock state of said set of clock states for which pulses are being generated by said first counter means;
second decoding means containing information relating to a predetermined set of control signals respectively corresponding to each clock state in said set of clock states, said second decoding means being responsive to said clock state signals and operative to develop a corresponding one of said set of control signals for input to said first counter means to cause it to develop said nonuniform clock signal; and
data handling apparatus for sampling the output of said data scanning means at a rate determined by said nonuniform clock signal to develop data from which a facsimile of the document scanned can be reproduced.

12. A document reproduction system comprising:
document carrying means;
document scanning means for scanning a document carried by said carrying means;
means associated with said scanning means for generating a uniform clock signal including a series of pulses having a predetermined relationship to said scanning means;
first counter means responsive to a set of predetermined control signals and operative to count the pulses in said uniform clock signal and to generate an output pulse each time a predetermined number of said uniform clock signal pulses commensurate with a particular control signal applied thereto are counted, the resulting series of output pulses constituting a nonuniform clock signal;
second counter means for counting each pulse in either said uniform clock signal or said nonuniform clock signal and for developing a pulse count signal;
first decoding means containing information relating to a predetermined set of clock states in a data scan line and information relating to a predetermined number of uniform clock signal pulses or nonuniform clock signal pulses corresponding to each of said clock states, said first decoding means being responsive to said pulse count signal and a clock state signal and operative to output an increment signal each time a particular combination of pulse count signal and clock state signal is input thereto;
third counter means for counting said increment signals and for developing said clock state signal, said clock state signal identifying at any point in time the particular clock state of said set of clock states for which pulses are being generated by said first counter means;
second decoding means containing information relating to a predetermined set of control signals respectively corresponding to each clock state in said set of clock states, said second decoding means being responsive to said clock state signals and operative to develop a corresponding one of said set of control signals for input to said first counter means to cause it to develop said nonuniform clock signal; and
data handling apparatus for sampling the output of said scanning means at a rate determined by said nonuniform clock signal to develop data from which a facsimile of the document scans can be reproduced.

* * * * *